(12) United States Patent
Yeh

(10) Patent No.: US 9,050,781 B2
(45) Date of Patent: *Jun. 9, 2015

(54) EXPANDED LAMINATE

(76) Inventor: Tzong In Yeh, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/313,507

(22) Filed: Dec. 7, 2011

(65) Prior Publication Data

US 2012/0196104 A1 Aug. 2, 2012

(30) Foreign Application Priority Data

Jan. 27, 2011 (TW) .............................. 100103158 A
Aug. 10, 2011 (TW) .............................. 100128451 A

(51) Int. Cl.
| | | |
|---|---|---|
| *B32B 3/26* | (2006.01) | |
| *B32B 27/06* | (2006.01) | |
| *B32B 5/32* | (2006.01) | |
| *B32B 27/32* | (2006.01) | |
| *B32B 27/36* | (2006.01) | |
| *B32B 27/30* | (2006.01) | |

(52) U.S. Cl.
CPC ........ *B32B 27/065* (2013.01); *Y10T 428/24967* (2015.01); *B32B 5/32* (2013.01); *B32B 2266/0228* (2013.01); *B32B 27/32* (2013.01); *B32B 27/365* (2013.01); *B32B 27/308* (2013.01); *B32B 2250/03* (2013.01); *B32B 2250/246* (2013.01); *B32B 2250/40* (2013.01); *B32B 2266/025* (2013.01); *B32B 2305/022* (2013.01); *B32B 2307/558* (2013.01); *B32B 2307/56* (2013.01); *B32B 2307/72* (2013.01)

(58) Field of Classification Search
CPC .. B32B 5/32; B32B 27/065; B32B 2266/025; B32B 2266/0228; B32B 27/32; B32B 27/365; B32B 2307/56
USPC ................................ 428/316.6, 319.3, 319.7
See application file for complete search history.

(56) References Cited

U.S. PATENT DOCUMENTS

| | | | | |
|---|---|---|---|---|
| 4,172,918 | A * | 10/1979 | Doerer ........................... | 428/174 |
| 6,492,013 | B1 * | 12/2002 | Ramesh ...................... | 428/308.4 |
| 6,541,105 | B1 * | 4/2003 | Park ............................ | 428/304.4 |
| 2005/0126848 | A1 * | 6/2005 | Siavoshai et al. ............. | 181/207 |
| 2005/0170719 | A1 * | 8/2005 | Lin ................................ | 441/74 |
| 2006/0134401 | A1 * | 6/2006 | Yeh ............................ | 428/316.6 |
| 2007/0059515 | A1 * | 3/2007 | Cheung ....................... | 428/314.8 |

* cited by examiner

*Primary Examiner* — Hai Vo
(74) *Attorney, Agent, or Firm* — Muncy, Geissler, Olds & Lowe, P.C.

(57) ABSTRACT

An expanded laminate material includes a plastic sheet and two expanded layers. The plastic sheet has upper and lower surfaces and a thickness of between about 0.05 and 1 mm. The first expanded layer has upper and lower surfaces, a foam density of between about 1.2 and 8 pcf and a thickness of between about 1 and 8 mm. The lower surface of the first expanded layer is directly bonded to the upper surface of the plastic sheet. The a second expanded layer has upper and lower surfaces, a foam density of between about 1.2 and 8 pcf and a thickness of between about 1 and 8 mm. The upper surface of the second expanded layer is directly bonded to the lower surface of the plastic sheet. The first and second expanded layers comprise a material selected from the group consisting of expanded polyethylene and expanded polypropylene.

2 Claims, 9 Drawing Sheets

EXPANDED LAMINATE

BACKGROUND OF INVENTION

1. Field of Invention

The present invention relates to an expanded laminate and, more particularly, to an expanded laminate for use as a cushion in a snow board, surf board, trunk or other product.

2. Related Prior Art

Expanded materials are often used in foam core or soft snow sliders and boards as well as soft body and surf boards. Such materials are light and inexpensive. As disclosed in U.S. Pat. Nos. 7,160,164, 7,029,349 and 7,430,795 for example, an expanded materials product generally includes a single expanded core and one or more expanded skin adhered to the expanded core. Such an expanded skin generally includes a plastic film, a bonding layer and an expanded layer. The density of the expanded layer is higher than the density of the expanded core.

Such expanded products are often subjected to impacts during use. For example, while surfing, a surfer exerts considerable impacts on and may compress or dent portions of a surf board corresponding to his or her hands, elbows, knees, feet, head and hips.

Referring now to FIG. 9, a conventional expanded body board product is shown. The expanded product includes an expanded core 90 wrapped in an outer layer or skin 91. A dent A is made in the expanded core 90 through the skin 91. The problem related to such dents is particularly serious where the expanded core 90 is made of expanded polystyrene ("EPS") or other material that cannot readily return to its original shape.

The present invention is therefore intended to overcome or at least alleviate the problems encountered in prior art.

SUMMARY OF INVENTION

It is an objective of the present invention to provide an expanded laminate comprising a plastic sheet and first and second expanded layers directly bonded to upper and lower surfaces of the plastic sheet, respectively. The plastic sheet may be made of a polyethylene ("PE"), an oriented polypropylene ("OPP"), a polycarbonate ("PC") or similar material, including Surlyn® resin made by DuPont. The plastic sheet is preferably between about 0.05 mm and 1 mm thick. The first expanded layer and the second expanded layer may be made of any combination of expanded polyethylene ("EPE") and expanded polypropylene ("EPP"). The foam density of the first and second expanded layers is preferably between 1.2 pcf (pounds per cubic foot) and 8 pcf. The thickness of the first and second expanded layers is preferably between 1 mm and 8 mm.

It is another objective of the present invention to provide products advantageously including the expanded laminate of the present invention, including but not limited to body boards, surfboards, snow boards, sliders, luggage, trucks, bags, containers, packaging, crates, housings and similar products. The product of the present invention may further comprise an upper expanded skin and an expanded core. The expanded laminate is located between the upper expanded skin and the expanded core. An upper surface of the first expanded layer of the expanded laminate is directly bonded to a lower surface of the upper expanded skin. A lower surface of the second expanded layer of the expanded laminate is directly bonded to an upper surface of the expanded core.

The expanded laminate may further include a plastic film, a lower expanded skin and a plastic plate. The plastic film covers and is directly bonded to an upper surface of the upper expanded skin. The expanded skin is preferably made of EPE. An upper surface of the expanded skin generally covers and is directly bonded to a lower surface of the expanded core. The plastic plate generally covers and is directly bonded to a lower surface of the lower expanded skin.

The expanded laminate may further comprise a plastic coat layer. The plastic coat is preferably a laminate layer comprising a durable layer such as a Surlyn® resin layer along with a bonding layer and a PE layer. The durable layer such as the Surlyn® resin layer is directly bonded to the PE layer by the bonding layer. The PE layer is directly bonded to the upper surface of the first expanded layer. Alternatively, the plastic coat may include a single layer made of PE, OPP, PC or Surlyn® resin.

In comparison with the prior art, the expanded laminate of the present invention effectively distributes and cushions impacts, forces and shock. When used as a product or part of a product, the expanded laminate provides excellent impact resistance and cushioning to prevent the product from dents, impact and shock.

Other objectives, advantages and features of the present invention will be apparent from the following description referring to the attached drawings.

BRIEF DESCRIPTION OF DRAWINGS

The present invention will be described via detailed illustration of four embodiments versus the prior art referring to the drawings wherein.

DETAILED DESCRIPTION OF EMBODIMENTS

Figure 1:
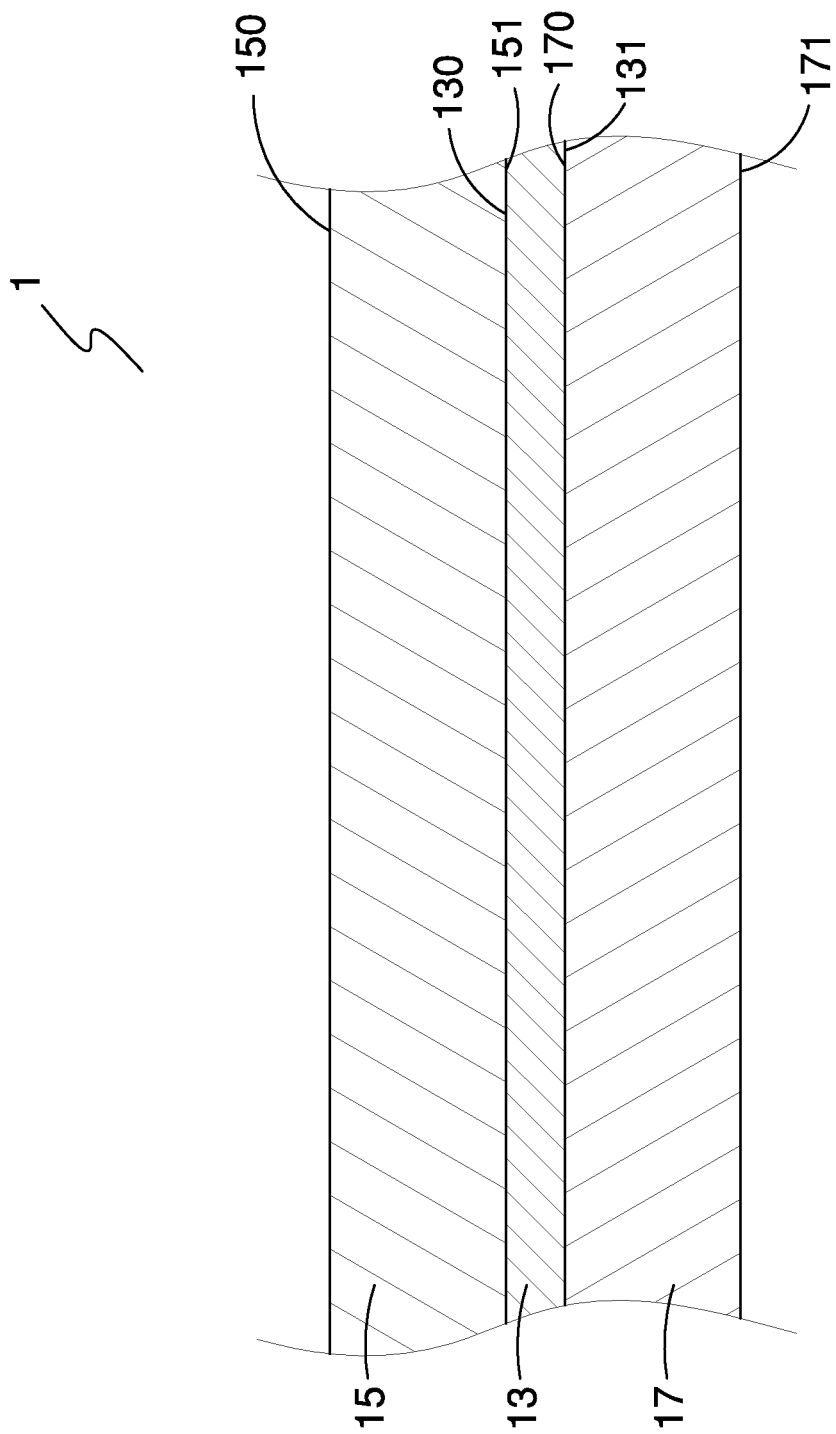
FIG. 1 is a partial, cross-sectional view of an expanded laminate in accordance with the first embodiment of the present invention.

Referring to FIG. 1, an expanded laminate material is shown in accordance with a first embodiment of the present invention. The expanded laminate 1 includes a plastic sheet 13, a first expanded layer 15 and a second expanded layer 17. An upper surface 130 of the plastic sheet 13 is directly bonded to the lower surface 151 of the first expanded layer 15. A lower surface 131 of the plastic sheet 13 is directly bonded to the upper surface 170 of the second expanded layer 17. As used herein, the term "directly bonded to" means bonded to without using an adhesive, bonding layer or any other medium. Accordingly, the plastic sheet 13 is bonded to the first expanded layer 15 and the second expanded layer 17 without adhesive or any other medium.

The plastic sheet 13 may be made high-density, medium density, or low-density polyethylene ("PE"), oriented polypropylene ("OPP"), polycarbonate ("PC") or a durable material such as Surlyn® resin made by DuPont or similar durable material. The plastic sheet 13 is preferably between about 0.05 mm and 1 mm thick. Both of the first expanded layer 15 and the second expanded layer 17 may be made of any combination of expanded polyethylene ("EPE") and expanded polypropylene ("EPP"). The foam density of the first expanded layer 15 and the second expanded layer 17 is preferably between about 1.2 and 8 pounds per cubic foot ("pcf"). The first expanded layer 15 and the second expanded layer 17 are preferably between about 1 mm and 8 mm thick. It should be noted that the thickness and foam density of the first expanded layer 15 and the thickness and foam density of the second expanded layer 17 may be identical or different.

Figure 2:
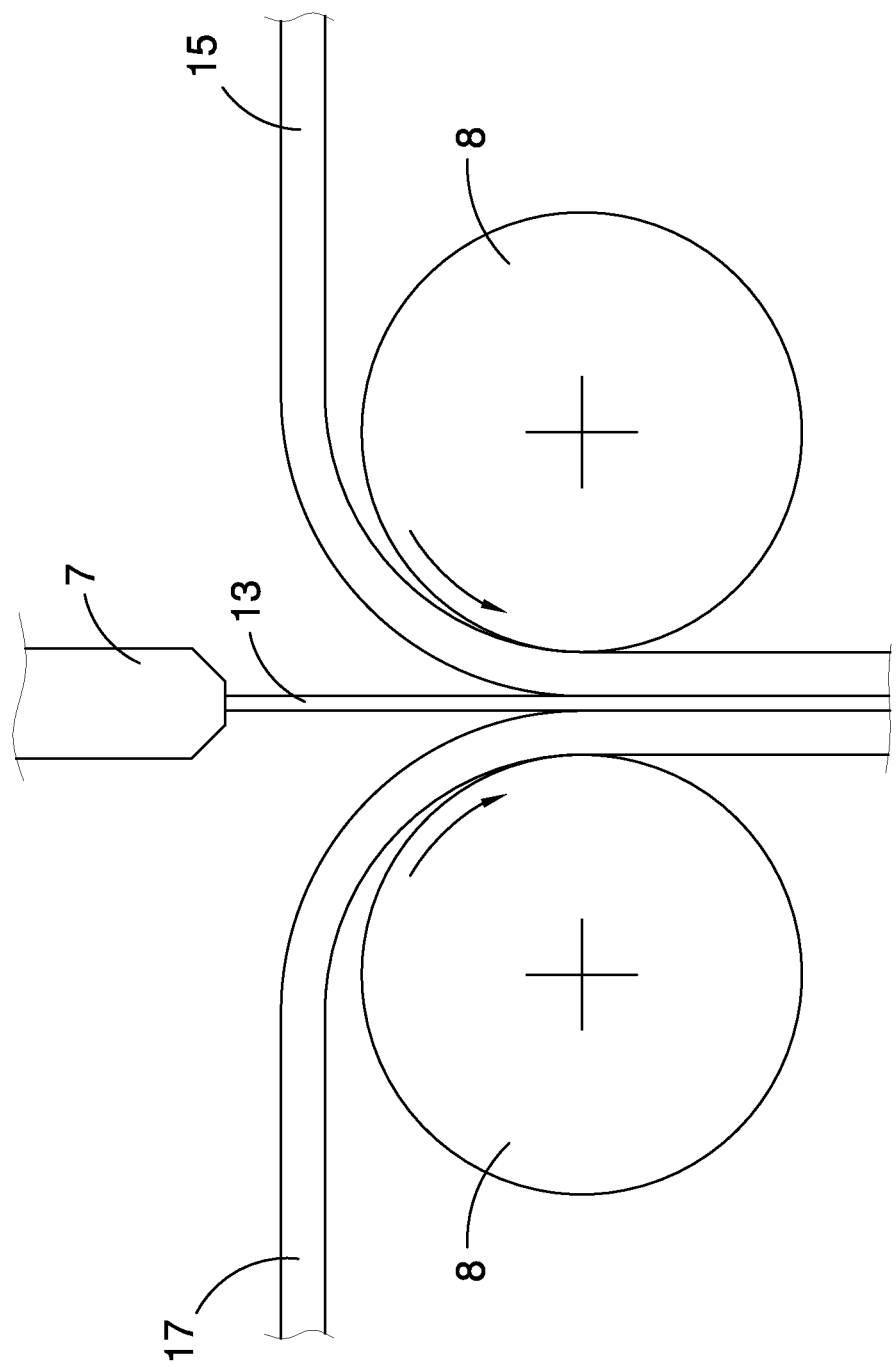
FIG. 2 is a partial, side view of a machine and method for making the expanded laminate shown in FIG. 1.

Referring now to FIG. 2, it is shown how to bond the plastic sheet 13 to the first expanded layer or sheet 15 and the second expanded layer or sheet 17 without having to use an adhesive, bonding layer or other medium. At first, the first expanded layer 15 and the second expanded layer 17 are directed into a gap between two rollers 8 while plastic sheet 13 in a molten form is extruded from an extruder 7 and directed into a gap between the first expanded layer 15 and the second expanded layer 17. Then, the rollers 8 are driven to roll and sandwich the molten plastic sheet 13 between the first and the second expanded layers 15 and 17.

The plastic sheet 13 is heated, molten and naturally adhesive when it is extruded from the extruder 7. Some of the heat of the plastic sheet 13 acts to advantageously heat and melt a portion of the first expanded layer 15 and a portion of the second expanded layer 17 so that the portions of the first expanded layer 15 and the second expanded layer 17 are naturally adhered to the plastic sheet 13. Thus, the plastic sheet 13, the first expanded layer 15 and the second expanded layer 17 are firmly and uniformly bonded to one another after they are rolled by the rollers 8 and cooled. In addition, the plastic sheet 13 becomes tough after it is cooled, and is able to cushion impacts exerted thereon through the first expanded layer 15 or the second expanded layer 17. Similarly, the expanded layers 15 and 17 act to support the plastic sheet 13.

Figure 3:
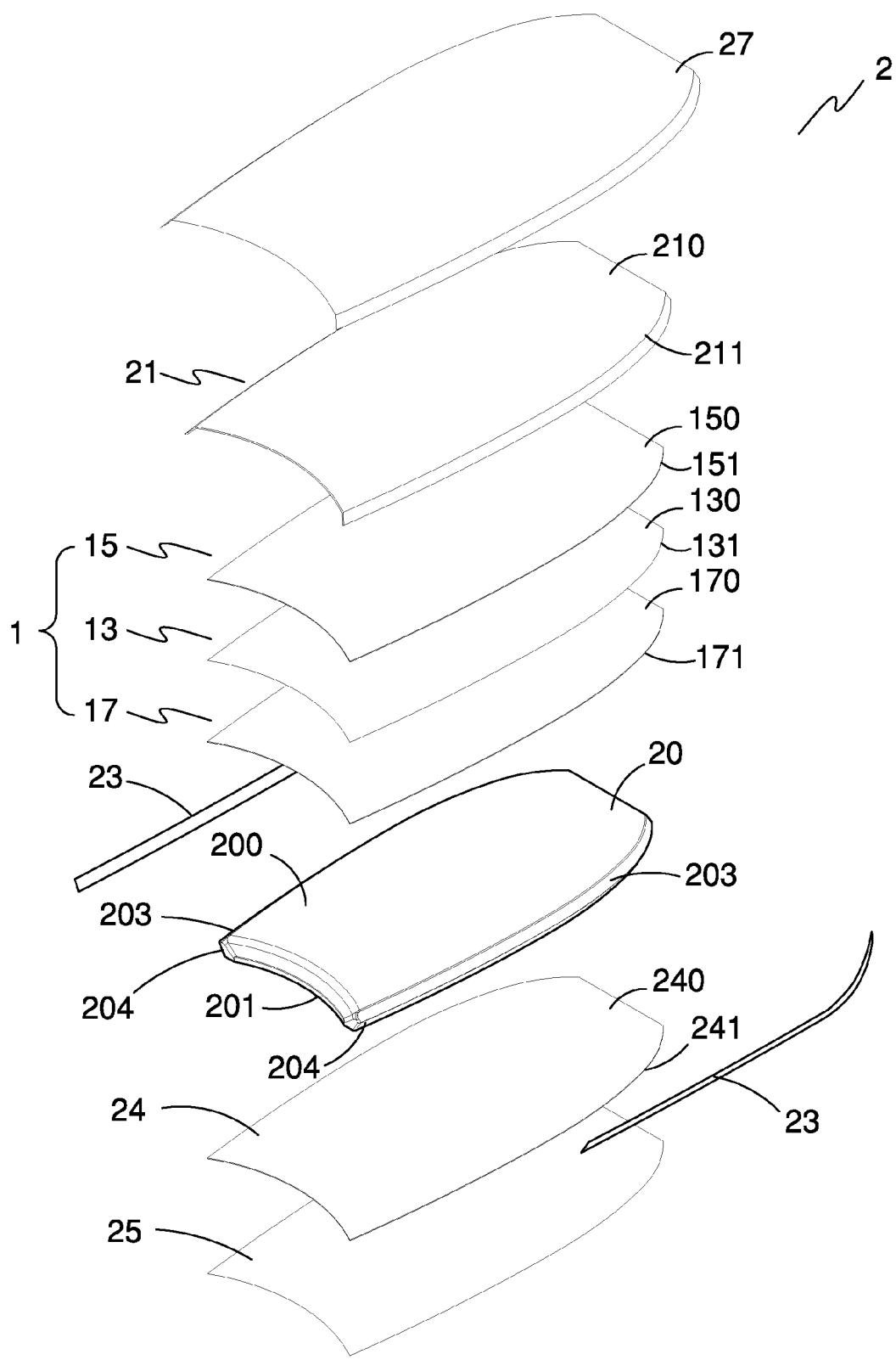
FIG. 3 is an exploded view of a body board in accordance with the second embodiment of the present invention.
Figure 4:
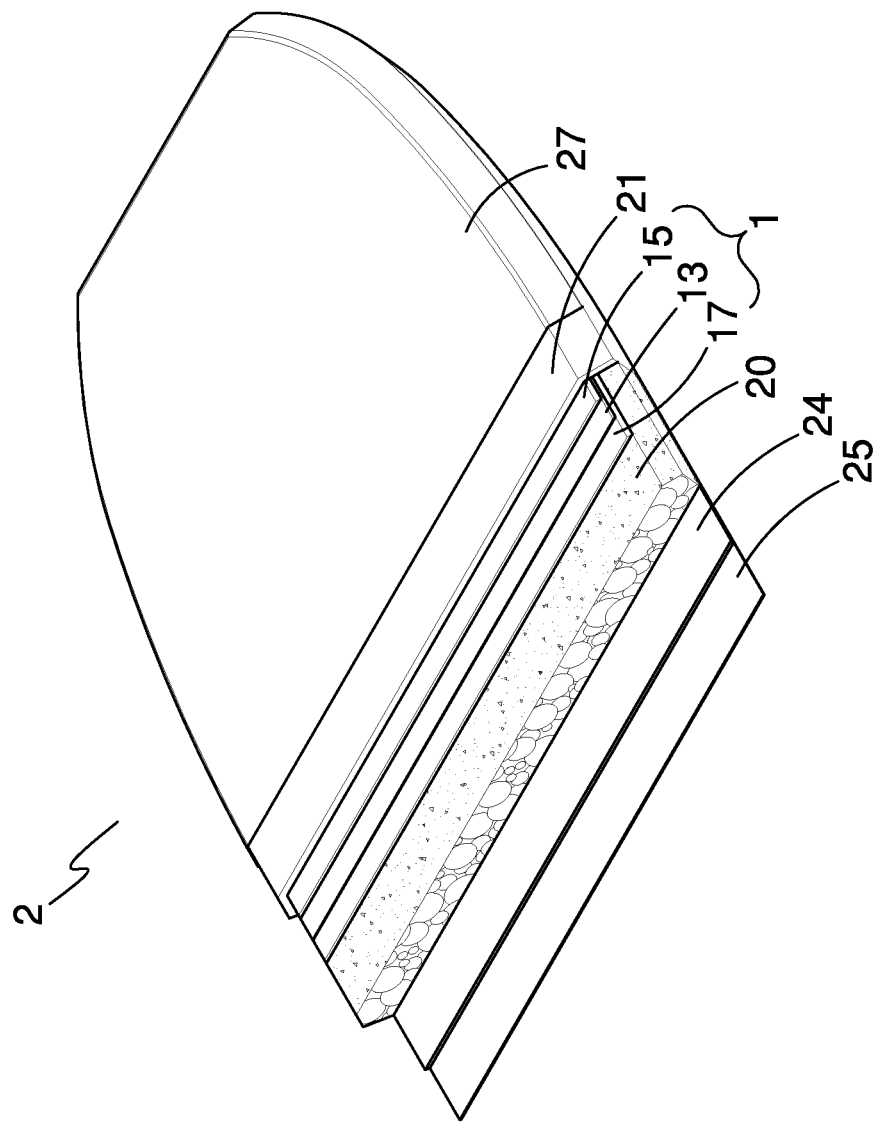
FIG. 4 is a cut-away view of the body board shown in FIG. 3.
Figure 5:
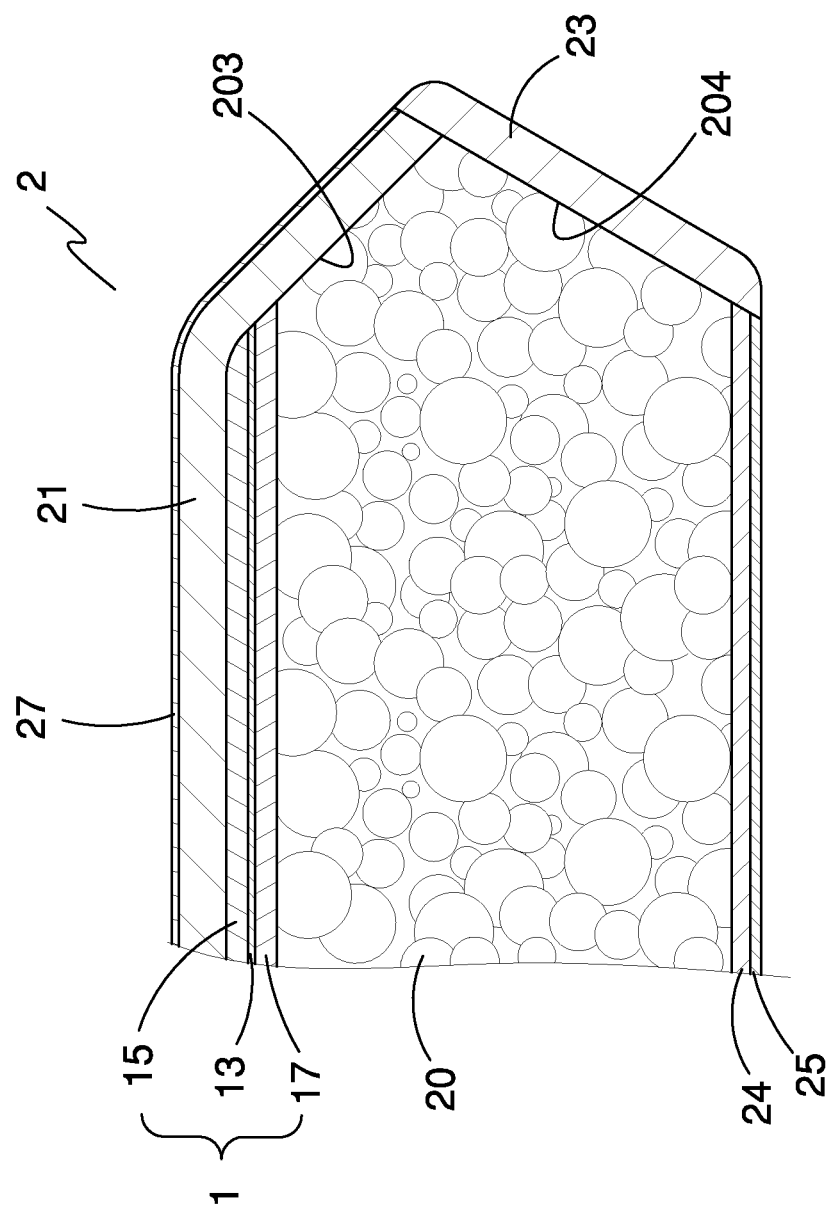
FIG. 5 is a partial, cross-sectional view of the body board shown in FIG. 3.

Referring to FIGS. 3 through 5, a riding board 2 is shown in accordance with a second embodiment of the present invention. The riding board 2 may be a body board, a slider, a long board, a short board, a knee board, a skim board or any other stand up or lay down type riding product. The riding board 2 includes the expanded laminate 1, an expanded core 20, an upper expanded skin 21, a plastic film 27, two lateral expanded skins 23, a lower expanded skin 24 and a plastic plate 25.

The expanded laminate 1 is sandwiched between the expanded core 20 and the upper expanded skin 21. The upper surface 150 of the first expanded layer 15 of the expanded laminate 1 is bonded to a lower surface 211 of the upper expanded skin 21. The lower surface 171 of the second expanded layer 17 of the expanded laminate 1 is bonded to an upper surface 200 of the expanded core 20.

The lower surface 211 of the upper expanded skin 21 extends beyond the upper surface 200 of the expanded core 20 and covers two upper flanks 203. The plastic film 27 covers the entire upper surface 210 of the upper expanded skin 21. The expanded skins 23 covers two lower flanks 204 of the expanded core 20. An upper surface 240 of the lower expanded skin 24 is bonded to the lower surface 201 of the expanded core 20 and covers the entire lower surface 201 of the expanded core 20. The plastic plate 25 is bonded to a lower surface 241 of the lower expanded skin 24 and covers the entire lower surface 241 of the lower expanded skin 24. The plastic plate 25 may itself be a laminate or a single layer. Preferably, the plastic plate 25 is wear and abrasion resistant.

It should be noted that the upper expanded skin 21, the expanded laminate 1 and the expanded core 20 may be bonded to one another by any proper adhesive, heat pressing or similar technique, dependent on the materials used and properties. Similarly, the expanded core 20, the lateral expanded skins 23, the lower expanded skin 24 and the plastic plate 25 may be bonded to one another by any proper adhesive, heat pressing or similar techniques, dependent on what materials are used and their respective properties.

Preferably, the upper expanded skin 21 may be made from an EPE. The density of the upper expanded skin 21 is preferably between about 4 and 6 pcf but may be somewhat more or less depending on the product or its applications. The thickness of the upper expanded skin 21 is preferably between about 4 and 5 mm, but may be somewhat more or less depending on the product or its applications.

As an example, the expanded core 20 may be made from an expanded polystyrene ("EPS") for example. Where the expanded core 20 is made of an EPS and the second expanded layer 17, the expanded skins 23 and the lower expanded skin 24 are made of an EPE, each of the second expanded layer 17, the lateral expanded skins 23 and the lower expanded skin 24 may be bonded to the expanded core 20 by a bonding layer or a layer of an interface material, an adhesive or by heat pressing. The interface material may be a copolymer that can bond EPS to PE.

When impacts, shock or similar forces are exerted on the plastic film 27 of the board 2, the expanded laminate 1, which includes the first expanded layer 15, the plastic sheet 13 and the second expanded layer 17, and particularly the plastic sheet 13, effectively distributes and cushions the forces otherwise impacting the expanded core 20 through the upper expanded skin 21. Hence, the board 2 is protected and permanent dents prevented.

In addition, the board 2 may further include a pattern for aesthetic purposes or identification. The pattern may be provided on the upper surface 210 of the upper expanded skin 21. The pattern may alternatively be provided on or in the plastic film 27. Moreover, the plastic film 27 may be a colored plastic film. Another pattern may be provided on a lower surface of the plastic plate 25 or in the plastic plate 25. The pattern may be provided by heat pressing, branding, screen printing, color printing, transfer or adhesion or other methods as known in the art.

It should be noted that the upper expanded skin 21 may be saved from the riding board 2 so that the plastic film 27 covers and is bonded to the upper surface 150 of the first expanded layer 15.

The area of the expanded laminate 1 is preferably substantially identical to the area of the upper surface 200 of the expanded core 20 in the first embodiment. However, the expanded laminate 1 may be replaced with a plurality of smaller expanded laminates that are made with smaller areas than the upper surface 200 of the expanded core 20. Each of the smaller expanded laminates may be located in a region of the board 2 (or other product) in which impacts are to be absorbed and cushioned. For example, the regions of the board 2 may be located corresponding to the hands, elbows, knees and head of a rider as well as the bottom surface where impacts and similar forces are expected.

In comparison with the prior art, the expanded laminate 1, which includes the first expanded layer 15, the plastic sheet 13 and the second expanded layer 17, provided on or in the board 2, effectively cushions impacts, forces and shock to reduce the effect of those forces exerted on the board 2 and hence protects the board 2 from damage, shock and permanent dents. Similarly, the expanded laminate of the present invention may be used to construct products or at least a portion of such products, including but not limited to body boards, surfboards, snow boards, sliders, standing surfaces, toys, luggage, trunks, bags, containers, crates, housings, surface liners, working surfaces, desk tops, resting surfaces, and most any other product that may be subject to impact, shock or compressive forces as well as any items being protected or contained.

Figure 6:
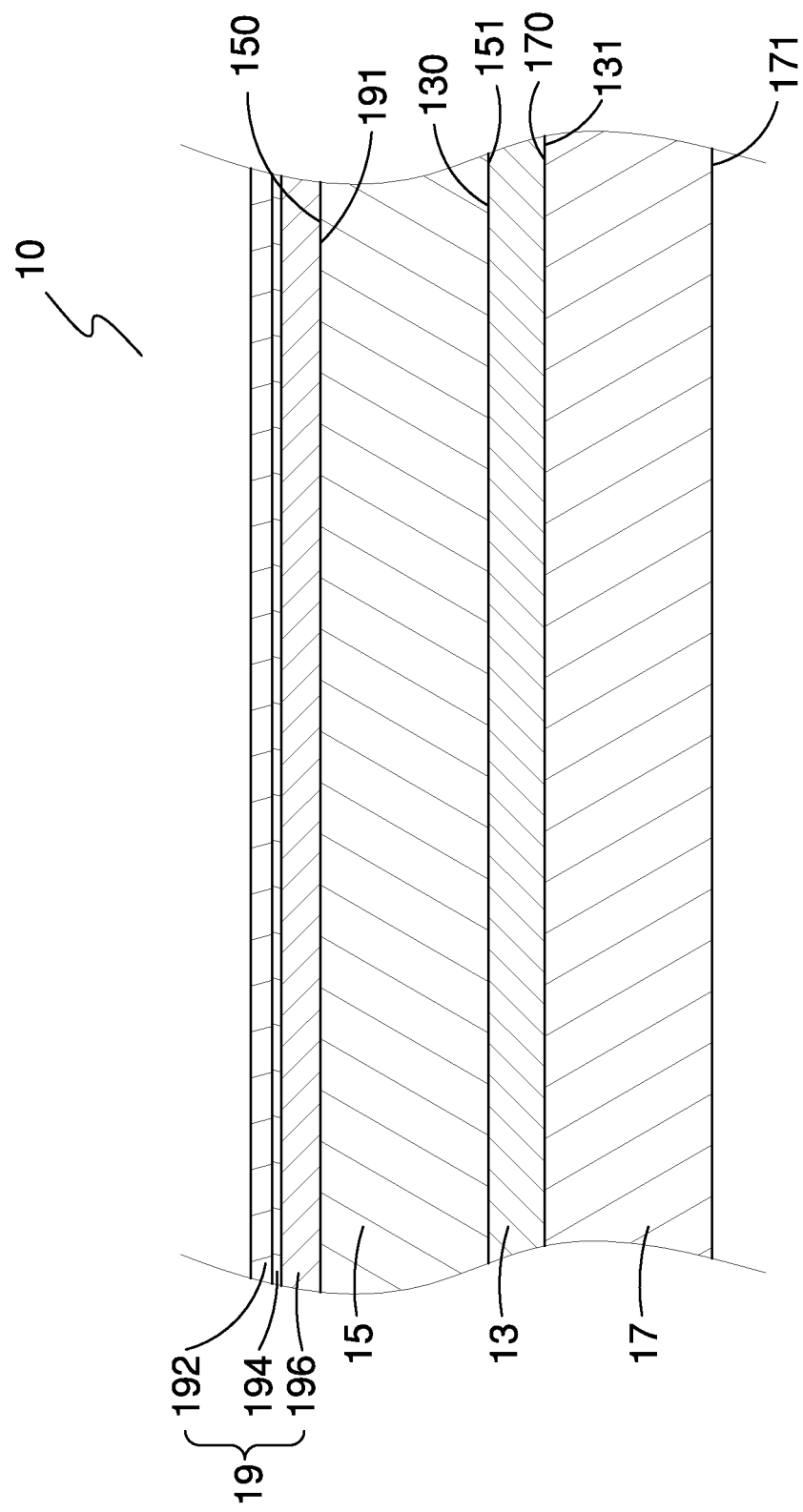
FIG. 6 is a partial, cross-sectional view of an expanded laminate in accordance with the third embodiment of the present invention.

Referring now to FIG. 6, an expanded laminate 10 is shown in accordance with a third embodiment of the present invention. The expanded laminate 10 of this third embodiment further comprises a plastic coat 19 provided on the expanded laminate 1 of FIG. 1. The plastic coat 19 is a laminate layer that preferably includes a durable outer layer 192 such as a Surlyn® resin layer along with a bonding layer 194 and a PE layer 196. Alternatively, the plastic coat layer 19 may comprise a durable outer layer 192 along with a plurality of softer inner layer 196. Although the bonding layer 194 is preferable in the instant embodiment, other materials may bond sufficiently without the need for such bonding layer. Moreover, an adhesive may be used in place of such bonding layer 194.

A lower surface of the durable outer layer 192 such as the Surlyn® resin layer is bonded to an upper surface of the bonding layer 194. A lower surface of the bonding layer 194 is bonded to an upper surface of the PE layer 196. That is, the Surlyn® resin layer 192 is preferably bonded to the PE layer 196 using the bonding layer 194. A lower surface 191 of the PE layer 196 is directly bonded to the upper surface 150 of the first expanded layer 15. The plastic coat 19 is preferably between about 0.1 and 1 mm thick. When using the Surlyn® resin layer 192 as the outer layer 192, it is preferably about 0.25 mm thick but may be thicker or even thinner based on the product and expected impacts. The bonding layer 194 is preferably about 0.1 mm thick though this may vary depending upon the bonding material and the materials being bonded. The PE layer 196 is preferably about 0.45 mm thick.

Surlyn® resin as the outer layer 192 is presently preferred as it has excellent elasticity, strength and durability so that it is not easily deformed permanently or damaged. Furthermore, Surlyn® resin as the outer layer 192 is wear-resistant and scratch-resistant. Therefore, Surlyn® resin or a material with similar characteristics is a preferred outer layer 192. The PE layer 196 is preferably used to reduce the amount of the Surlyn® resin necessary in the plastic coat 19, while providing the necessary impact resistance and force distribution. When the expanded laminate 10 is used to make a product, such as, for example, a snow slider, body board, surfboard, luggage, mat, carrying bag, the second expanded layer 17 is preferably located internally or even as an internal side of the product while the durable outer layer 192 of the plastic coat 19 is located on an external side of the product. That is, the plastic coat 19 takes impacts from the exterior directly. On the other hand, the plastic sheet 13 takes the impacts indirectly through the plastic coat 19 and the first expanded layer 15. Therefore, the thickness of the plastic coat 19 is preferably greater than or identical to the thickness of the plastic sheet 13. In addition, using a Surlyn® resin as the outer layer 192 of the plastic coat 19 makes the external side of the product look smooth.

The expanded laminate 10 may further include a pattern for aesthetic purposes or identification. The pattern may be provided on the upper or lower surface of the outer layer 192 or the upper or lower surface of the PE layer 196.

Figure 7:
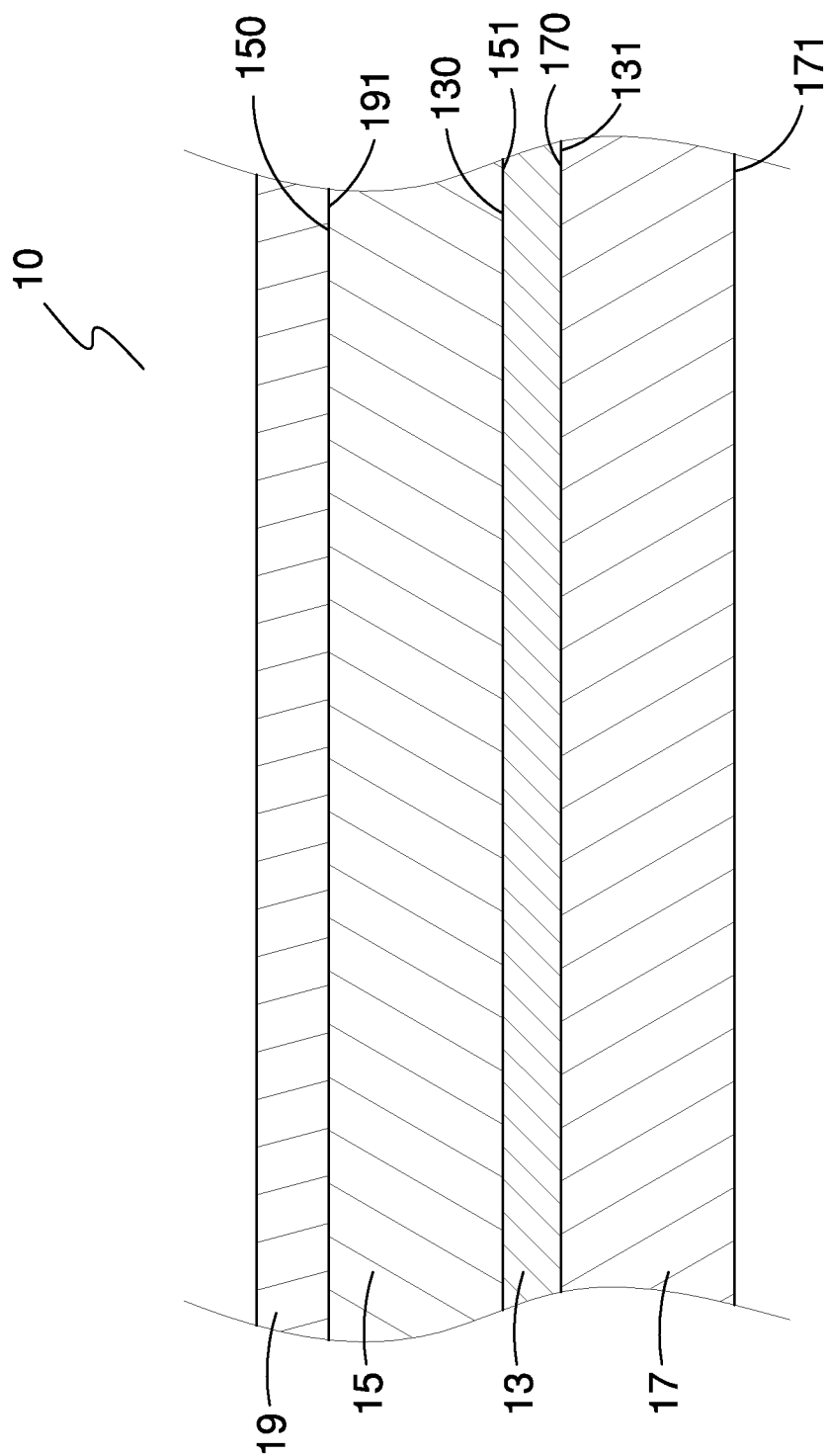
FIG. 7 is a partial, cross-sectional view of an expanded laminate in accordance with the fourth embodiment of the present invention.

Referring now to FIG. 7, an expanded laminate 10 is shown in accordance with a fourth embodiment of the present invention. The fourth embodiment is similar to the third embodiment except that the plastic coat layer 19 solely comprises a single layer. The plastic coat layer 19 is made high-density or low-density PE, OFF, PC or Surlyn® resin produced by DuPont. In specific, the plastic coat 19 may be extruded, in a molten form, from the extruder and directed into the gap between the rollers 8 (FIG. 2). The plastic coat 19 and the expanded laminate 1 are rolled, pressed and cooled by the rollers 8. Thus, the lower surface 191 of the plastic coat 19 is directly bonded to the upper surface 150 of the first expanded layer 15. Thus, the plastic coat 19 is formed and bonded to the expanded laminate 1.

Figure 8:
FIG. 8 is a perspective view of a luggage product including the expanded laminate shown in FIG. 1.
Figure 9:
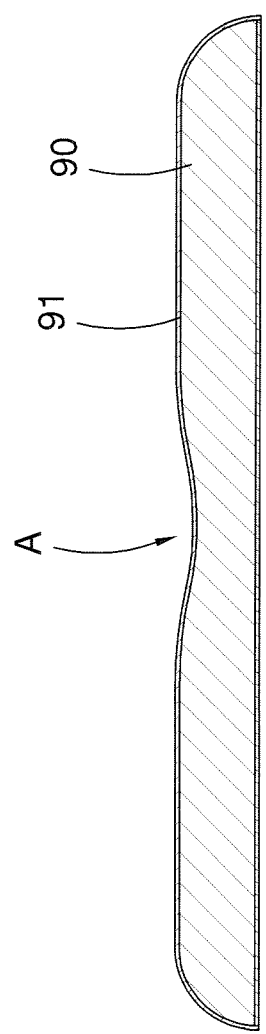
FIG. 9 is a cross-sectional view of conventional expanded materials of the prior art.

Referring now to FIG. 8 in conjunction with FIGS. 6 and 7, a trunk 100 or conventional piece of luggage is shown that includes the expanded laminate 10 (FIG. 6). The second expanded layer 17 is located on an internal side of the truck while the durable layer 192, such as the preferable Surlyn® resin layer of the plastic coat 19 is located on an external side of the product. When the trunk 100 is hit or otherwise impacted, the expanded laminate 10 cushions and distributes the impact forces. Therefore, the trunk 100 is protected from permanent dents or fractures. Similarly, the expanded laminate may be used on a variety of products subject to impacts, shock and even compressive forces.

The foregoing description of the embodiments of the invention has been presented for the purposes of illustration and description. It is not intended to be exhaustive or to limit the invention to the precise forms or methods disclosed Persons skilled in the relevant art can appreciate that many modifications and variations are possible in light of the above teachings.

The invention claimed is:

1. A product comprising:
    an expanded laminate including:
        a plastic sheet having an upper surface, a lower surface and a thickness between 0.05 mm and 1 mm, wherein the plastic sheet is made of 100% single polymer wherein the single polymer is a low-density polyethylene, a medium-density polyethylene, a high-density polyethylene, a polypropylene, a polycarbonate or an ionomeric ethylene copolymer;
        a first expanded layer having an upper surface, a lower surface, a foam density between 1.2 pcf and 8.0 pcf and a thickness between 1 mm to 8 mm; wherein the first expanded layer is made of a material selected from the group consisting of expanded polyethylene and expanded polypropylene; the lower surface of the first expanded layer is directly bonded to the upper surface of the plastic sheet; and
        a second expanded layer having an upper surface, a lower surface, a foam density between 1.2 pcf and 8.0 pcf and a thickness between 1 mm to 8 mm; wherein the second expanded layer is made of a material selected from the group consisting of expanded polyethylene and expanded polypropylene; the upper surface of the second expanded layer is directly bonded to the lower surface of the plastic sheet;
        an upper expanded skin bonded to the upper surface of the first expanded layer; wherein the upper expanded skin is made of expanded polyethylene;
        an expanded core having an upper surface and a lower surface, wherein the upper surface of the expanded core is bonded to the lower surface of the second expanded layer; wherein the expanded core is made of expanded polystyrene;

a lower expanded skin having an upper surface and a lower surface, wherein the lower expanded skin is made of expanded polyethylene; the upper surface of the lower expanded skin is bonded to the lower surface of the expanded core and covers the entire lower surface of the expanded core; and a plastic plate bonded to the lower surface of the lower expanded skin, wherein the plastic plate covers the entire lower surface of the lower expanded skin;

wherein the plastic sheet is tough and able to cushion and distribute impacts exerted thereon through the first expanded layer or the second expanded layer.

2. The product of claim 1, further comprising:

a plastic film bonded to the upper surface of the upper expanded foam skin, and wherein the plastic film covers the entire upper surface of the upper expanded skin.

* * * * *